(12) United States Patent
Sims

(10) Patent No.: US 8,967,717 B2
(45) Date of Patent: Mar. 3, 2015

(54) PORTABLE CHILD RESTRAINING SEAT

(71) Applicant: Robert Miller Sims, Moseley, VA (US)

(72) Inventor: Robert Miller Sims, Moseley, VA (US)

(\*) Notice: Subject to any disclaimer, the term of this patent is extended or adjusted under 35 U.S.C. 154(b) by 147 days.

(21) Appl. No.: 13/649,273

(22) Filed: Oct. 11, 2012

(65) Prior Publication Data

US 2013/0147247 A1 Jun. 13, 2013

Related U.S. Application Data

(60) Provisional application No. 61/570,203, filed on Dec. 13, 2011.

(51) Int. Cl.
*A47C 1/08* (2006.01)
*A47D 15/00* (2006.01)

(52) U.S. Cl.
USPC .................................. 297/256.15; 297/487

(58) Field of Classification Search
CPC ................................. B60N 2/28; B60N 2/2839
USPC ................. 297/250.1, 256.15, 486, 487, 488
See application file for complete search history.

(56) References Cited

U.S. PATENT DOCUMENTS

| | | | |
|---|---|---|---|
| 2,661,221 A | 12/1953 | Lockwood et al. | |
| 2,876,829 A | 3/1959 | Johnson | |
| 3,262,716 A | 7/1966 | Graham | |
| 3,713,694 A | 1/1973 | Miller | |
| 3,722,951 A | 3/1973 | Ezquerra | |
| 3,829,158 A | 8/1974 | O'Connor | |
| 3,901,550 A | 8/1975 | Hamy | |
| 3,929,349 A | 12/1975 | Schubert | |
| 4,082,350 A | 4/1978 | Tomforde | |
| 4,230,366 A * | 10/1980 | Ruda | 297/487 |
| 4,376,551 A * | 3/1983 | Cone | 297/256.13 |
| 4,429,916 A | 2/1984 | Hyde et al. | |
| 4,770,468 A * | 9/1988 | Shubin | 297/487 |
| 5,056,869 A | 10/1991 | Morrison | |
| 5,427,432 A * | 6/1995 | Meeker et al. | 297/256.15 |
| 5,529,382 A | 6/1996 | Burkat | |
| 5,540,239 A | 7/1996 | McClellan | |
| 5,580,133 A | 12/1996 | Knox et al. | |
| 5,716,095 A | 2/1998 | Lopez | |
| 5,795,020 A * | 8/1998 | Sirico | 297/256.15 |
| 5,816,662 A | 10/1998 | Rumburg | |
| 6,068,335 A * | 5/2000 | Glover | 297/256.15 |
| 6,299,207 B1 | 10/2001 | Bares | |
| 6,394,492 B1 | 5/2002 | Corbett | |
| 6,860,563 B1 | 3/2005 | Semsch et al. | |
| 6,893,088 B2 * | 5/2005 | Kassai et al. | 297/250.1 |
| 7,073,866 B1 | 7/2006 | Berdahl | |
| 7,278,684 B2 * | 10/2007 | Boyle | 297/253 |
| 2004/0032157 A1 | 2/2004 | Trimborn | |
| 2011/0133532 A1 | 6/2011 | Zhao | |

\* cited by examiner

*Primary Examiner* — Philip Gabler
(74) *Attorney, Agent, or Firm* — The Concept Law Group, P.A.; Scott D. Smiley; Mark C. Johnson

(57) ABSTRACT

A portable child-restraining safety seat assembly and method of use includes providing a sub-seat with a body defining a secured seating area sized to securely hold a child or smaller-than-average adult human and a fixed-shape rotatable restraining member mechanically coupled to the body and having an open position where the seating area is unobstructed and a closed position where the seating area is obstructed by the restraining member. The seat further includes a first anchor member and a second anchor member each having a first end mechanically coupled to the body and a second end selectively attachable to corresponding anchoring points of functional primary seat.

20 Claims, 10 Drawing Sheets

PORTABLE CHILD RESTRAINING SEAT

CROSS-REFERENCE TO RELATED APPLICATION

This application claims priority to U.S. Provisional Patent Application No. 61/570,203, filed Dec. 13, 2011, the entirety of which is incorporated by reference.

FIELD OF THE INVENTION

The present invention relates generally to child restraint/safety devices, and, more particularly, relates to a portable child restraint/safety device equipped with a roller-coaster-type upper-body restraining member.

BACKGROUND OF THE INVENTION

In light the of curious and sometimes uncontrollable nature of children and for the purpose of protecting their small bodies, specially designed and sized child restraint/safety devices have been known and utilized for a significant period of time. For example, "high chairs," have been utilized to feed children since the beginning of recorded time and child transportation safety devices, i.e., "car seats," a relatively modern invention, are now a requirement in all states when transporting children in vehicles. These vehicles include automobiles, trains, airplanes, and many others. Having a mechanism to restrain the small bodies of children is axiomatic to the safety of the children involved, as many of the known restraining devices for adults are inadequate, unsafe, or uncomfortable for children.

Many known child-restraining devices are designed using a portable seat sized to accommodate and securely hold a child and attachable to a primary seat, i.e., a standard adult-sized seat provided within a vehicle. The portable seat is generally provided with a seat belt(s), latches, and/or buckles to fasten the child within the portable seat. The portable child seat is also provided with latches, straps, and/or anchors to attach the child seat to the primary seat. Generally, these prior-art devices have one or more belts/straps restraining the upper body portion of the child with one or more belts/straps retaining the lower body portion of the child. Modern child seat restraint systems mimic the five-point harness used for many years by race-car drivers.

When traveling for long periods of time, because of a child's known propensities to move around, or because of forces generated from driving or accidents, those belts/straps become uncomfortable and may even injure the children when retained. Moreover, some of these belts allow for a child to become injured or unintentionally released from the belts/straps if said belts/straps are not properly secured or fastened. Because of the flexibility of those known restraining belts/straps, children tend to maneuver in and out of them. The flexibility of the restraining belts/straps also require continued adjustment if restraining different sized children or to compensate for a growing child.

Furthermore, many known child restraining seats require the user to fasten the belts/straps using buckles, which also can be uncomfortable to the child, as they are generally placed by the legs of the child. The belts also have rather solid edges that tend to dig into the child's skin, most commonly in the neck and leg areas. This is a particular problem when the child falls asleep and leans to one side or the other, placing extra force on the neck/belt contact area.

Furthermore, many known child restraining devices place the safety-belt release button within reach of the child, i.e., between the child's legs. There have been many documented occurrences of children unbuckling themselves from their restraining seats, which reduces or eliminates the safety benefits the seat is intended to provide. Studies have shown that many children develop the motor skills to release themselves from the restraints, but do not have the cognitive recognition to understand the safety implications. These safety implications are especially present when a vehicle is in motion or, for non-vehicle applications, e.g., high chairs, while restrained at a position higher than the floor.

One alternative to seat belt restraining systems in vehicles is the generally U-shaped roller-coaster-type restraining member found in amusement park rides. To date, all known roller-coaster-type restraining members are large mechanical structures designed for outdoor use and under extreme mechanical forces, i.e., roller-coaster tracks. These types of restraint systems are particularly not suitable for use in a normal street-bound vehicle. This is because, in the event of an accident, the medical team needs to be able to easily remove the passengers through the simplest and quickest means possible. With the traditional seat belt restraint system, the medical team can quickly and easily cut the cloth material forming the seat belt in order to remove the passenger. If an automobile was equipped with the roller-coaster-type restraining system, which is traditionally formed with a solid U-shaped bar that passes over the person's shoulders and down in front of their torso area, removing the passenger could become extremely difficult because the solid bar cannot simply be cut as can the cloth seat belt. At a minimum, cutting through the solid bar could waste valuable time.

Because of the complex mechanical design parameters of roller-coaster-type restraint systems, seats featuring these devices are permanently affixed to their carrier, e.g., roller-coaster cars, and could in no way be considered portable and certainly could not be simply attached to an existing seat of an automobile. In fact, all known seats that feature roller-coaster-type restraining member are used in conjunction with rules that specifically exclude small children.

Therefore, a need exists to overcome the problems with the prior art as discussed above.

SUMMARY OF THE INVENTION

The present invention, which includes a safety sub-seat that quickly and easily attaches to a primary seat and features a roller-coaster-type restraining member, provides numerous advantages over the prior art. Until now, securing a child into a car seat has been a difficult task, requiring the threading of the child's arms through at least two separate seatbelts that come together in front of the child. Through use of the present invention, a parent merely needs to place the child into the seat and instantly lower the inventive roller-coaster-type restraining member into place, where it locks to secure the child within the seat. For removal, the parent merely needs to press a button and instantly lift the restraining member up and out of the way of the child. No longer will parents have to deal with the common situation of the seat belt being trapped under the child's body and the parent having to fish for it in order to restrain the child. In addition, the release mechanism is conveniently located out of the reach of the child, thereby ensuring that older children will not improperly disengage the safety mechanism. In the event of an emergency, the entire sub-seat can be removed from the vehicle by either activating the securing member latches or by cutting the cloth belts (standard seatbelt material) coupling it to the primary seat.

With the foregoing and other objects in view, there is provided, in accordance with the invention, a portable child-restraining safety seat assembly includes a sub-seat with a body defining a secured seating area sized to accommodate a child or smaller-than-average adult human and a generally U-shaped roller-coaster-type restraining member mechanically coupled to the body. The restraining member has a fixed pivot point and is rotatable toward and away from the seating area. The seat also includes a first anchor member and a second anchor member each having a first end mechanically coupled to the body and a second end selectively attachable to at least one anchoring point of a functional primary seat sized to fit an average adult-sized human.

In accordance with a further feature of the present invention, the secured seating area includes a back support member with an upper end and a lower end opposite the upper end, a head support member coupled to the back support member at its upper end, and a seat member extending away from the lower end of the back support member.

In accordance with yet another feature of the present invention, the first anchor member and the second anchor member include portions of standard seatbelt cloth material coupling anchor clasping heads to the sub-seat. The portions of standard seatbelt cloth material can be easily cut to remove the sub-seat from a vehicle in case of an emergency.

In accordance with one more feature of the present invention, the head support member includes a left head support portion and a right head support portion coupled to the generally U-shaped roller-coaster-type restraining member.

In accordance with a further feature of the present invention, the body is adapted to receive a portion of an existing seatbelt of a vehicle. In other words, the body is shaped so that a standard seatbelt can pass through and secure the sub-seat to the automobile's existing primary seat.

In accordance with an additional feature of the present invention, the roller-coaster-type restraining member is of a fixed substantially non-pliable material.

In accordance with yet another feature of the present invention, the roller-coaster-type restraining member is of a flexible resilient material formed in the general U-shape and the restraining member includes at least two locked positions along a translation path defined by the roller coaster-type restraining member when rotated toward and away from the seating area and the at least two locked positions include an upper locked position where the seating area is unobstructed by the generally U-shaped roller-coaster-type restraining member and a lower locked position where the seating area is obstructed by the generally U-shaped roller-coaster-type restraining member.

In accordance with one more feature of the present invention, the generally U-shaped roller-coaster-type restraining member is selectively couplable and decouplable to the sub-seat.

In accordance with another feature, the present invention includes a roller coaster-type restraining member emergency release switch that selectively uncouples the generally U-shaped roller-coaster-type restraining member from the sub-seat.

In accordance with an additional feature of the present invention, the emergency release switch is located outside the secured seating area.

In accordance with the present invention, a method for securely transporting a child includes the step of providing a portable child-restraining safety seat assembly having a sub-seat with a body defining a secured seating area sized to securely hold a child or smaller-than-average adult human and a fixed-shape rotatable restraining member mechanically coupled to the body and having an open position where the seating area is unobstructed and a closed position where the seating area is obstructed by the restraining member. The assembly also has a first anchor member and a second anchor member each having a first end mechanically coupled to the body and a second end selectively attachable to corresponding anchoring points of a functional primary seat sized to fit an average adult-sized human. The method further includes the steps of coupling the first anchor member to a first anchor point of a primary seat, coupling the second anchor member to a second anchor point of the primary seat, manipulating the fixed-shape rotatable restraining member to the open position, placing a child within the secured seating area, and manipulating the fixed-shape rotatable restraining member to the closed position.

In accordance with another feature, an embodiment of the present invention also includes selectively locking the fixed-shape rotatable restraining member into the closed position.

Although the invention is illustrated and described herein as embodied in a portable child restraining seat, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "selectively," as used herein is defined as something that can be repeatedly made or unmade. The term "selectively couplable," as used herein is defined as a connection with something that can be repeatedly made or unmade.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction from the seat member to the head support member.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
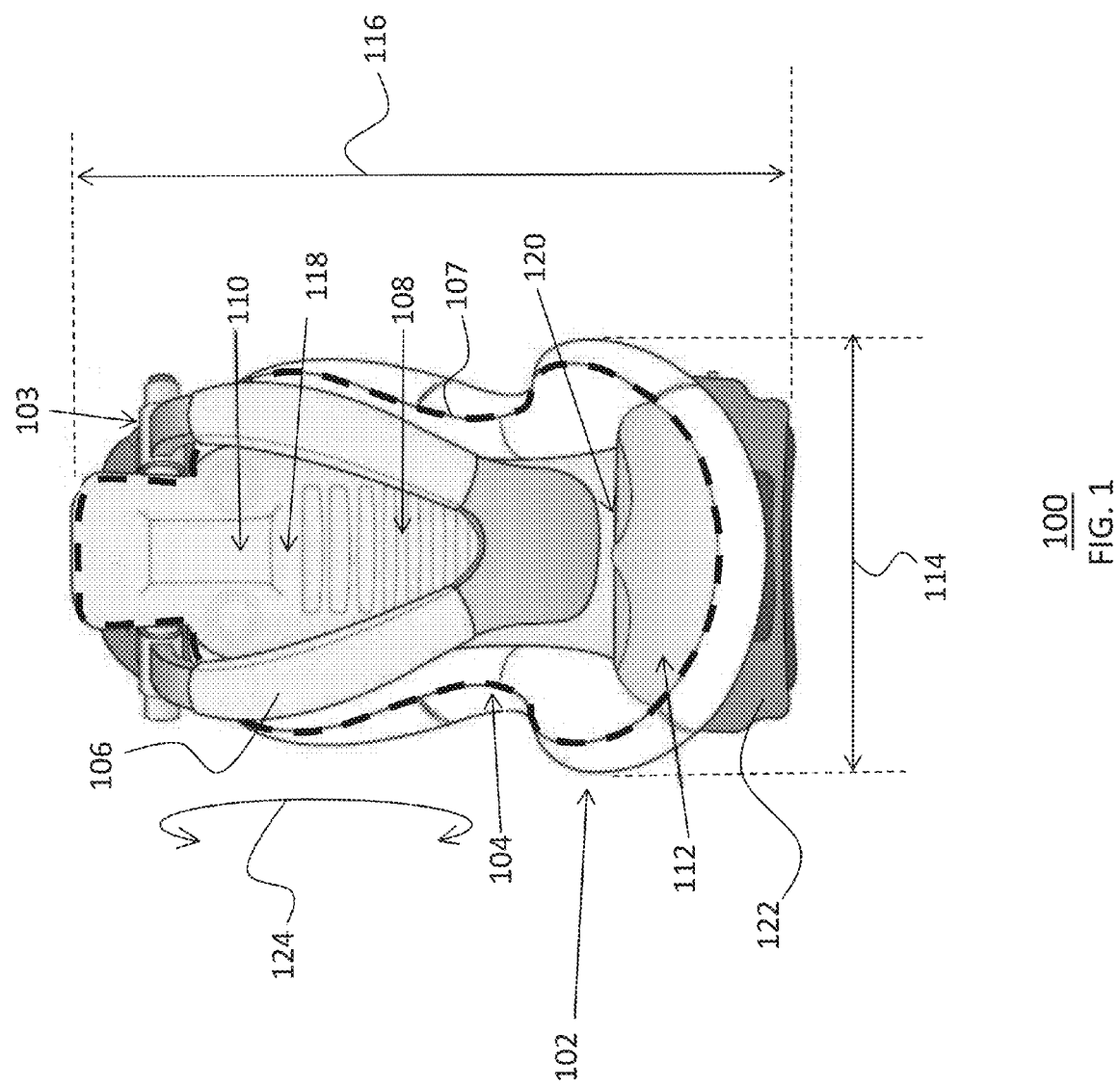
FIG. 1 is an elevational front view of a portable child restraining sub-seat having a body and a roller-coaster-type restraining member in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient seat to safely and comfortably restrain a child. Embodiments of the invention provide a roller-coaster-type restraining member that effectively restrains a child from the front of the seat, giving the child additional security and comfort. The novel roller-coaster-type child restraint seat advantageously provides a securing and unsecuring mechanism that is by far more simple and efficient than any system on the market today. Because infant and child car seats are attached to the actual car with standard cloth seatbelt materials that can be easily cut to easily remove the entire car seat, infant and child car seats are not susceptible to the general ban on roller-coaster-type restraining mechanisms in automobiles, which are known to create too many difficulties when removing victims of accidents. In addition, embodiments of the invention provide improved safety by placing a release switch outside of the reach of children restrained, such that a child will not inadvertently or intentionally unbuckle or release themselves from the restraints.

Referring now to FIG. 1, one embodiment of the present invention is shown in an elevational front view. FIG. 1 shows several advantageous features of the present invention, but, as will be described below, the invention can be provided in several shapes, sizes, combinations of features and components, and varying numbers and functions of the components. The first example of a portable child restraining seat assembly 100, as shown in FIG. 1, includes a sub-seat 102 with a body 104 and a roller coaster-type restraining member 106. FIG. 1 also shows the body 104 defining a seating area 107 sized to accommodate a child or smaller-than-average adult human. The seating area, as illustrated, is partially hidden by the roller coaster-type restraining member 106. The seating area 107 can be seen including a back support member 108, a head support member 110, and a seat member 112. In one embodiment, the body 104 contains the members 108, 110, 112, but should not be limited to only those members 108, 110, 112. In other embodiments, the body 104, or the members 108, 110, 112, may also include other attachments or additions that are within the spirit and scope of the invention.

Although the embodiment of the present invention illustrates the back support member 108, head support member 110, and seat member 112 as essentially one molded piece, the members 108, 110, 112 may be constructed independently and assembled together to form the body 104. Therefore the back support member 108 is designed and defined as a structure able to withstand and support a child's back area. The head support member 110 is designed and defined as a structure able to withstand and support a child's head. The seat member 112 is designed and defined as a structure able to withstand and support a child's body weight. As the design and construction of child seats, including the material, is generally known in the art, a detailed description as to the different shapes and materials used for standard child seats is not believe to be necessary.

In the illustrated embodiment of FIG. 1, the width 114 and length 116 of the restraining seat 100 are similar to those of standardly-available car seats. In other embodiments, the width 114 and length 116 may be varied or customized dependent on the vehicle or structure to which the sub-seat 102 is attached. In one embodiment, the secured seating area 107 is sized to accommodate a child or smaller-than-average adult human. The word "sized" is defined as having the ability to surround a child less than 8 years old partially from the sides and bottom of his or her body. Furthermore, it is sized to support a small-than-average adult human who is less than a total height, defined as being a distance from the bottom of the feet to the top of the head when lying prone, of approximately 4 feet. Moreover, "transport" is defined as having the ability to be easily detached from a secured location, e.g., the backseat of a car, and carried to another location, the backseat of a second car, by a person of average build. The body 104 being easily removable and transportable gives a significant benefit over those bodies having a roller coaster-type restraining member that are permanently installed onto a secondary structure or require significant time, expense, and effort to transport.

The back support member 108 includes an upper end 118 and a lower end 120 with the head support member 110 extending away from the upper end 118 of the back support member 108. In one embodiment, the head support member 110 is part of, or mechanically coupled to, the back support member 108. In other embodiments, the head support member 110 is or has the ability to be tilted or angled away from the back support member 108 for added support, comfort, or security of the child being restrained. Other embodiments of the invention may also provide for the back support member 108 to be reclined at certain angles with respect to the seat member 112 for the comfort of the child. The seat member 112 can also be seen in FIG. 1 extending away from the lower end 120 of the back support member 108, such that it will support the weight of a child from beneath and from behind. In one embodiment, the seat member 112 includes a base 122 beneath the seat member 112 that forms part of and serves as an attachment mechanism for sub-seat 102. In one embodiment, the base 122 may be just below the seat member 112, as illustrated. In other embodiments, the base 122 may also support the back support member 108 and/or the head support member 110. In another embodiment, the body 104 may also be reclined with respect to the base 122 such that a child may be in a more comfortable position. In other embodiments, the back support member 108 or other portion of the body 104 may include a portion of the base 122. In other embodiments, the child restraining seat 100 may not include a base 122 at all.

The roller-coaster-type restraining member 106, as illustrated in FIG. 1, is mechanically coupled to the body 104 of the sub-seat 102. In one embodiment, the roller coaster-type restraining member 106 is connected to a portion of the body 104 located adjacent to the head support member 110. In other embodiments, the roller-coaster-type member 106 is coupled to the upper end 118 of the back support member 108, the head support member 110, or other parts and/or attachments of the body 104.

In one embodiment, the roller coaster-type restraining member 106 is a generally U-shaped structure, generally associated with roller coasters such as a lap-bar or fixed-shape harnesses, that rotates at a fixed pivot point 103 with respect to a portion of the seat 102 in which a person, or in accordance with this invention, a child or smaller-than-average sized human, sits. The term "U-shaped," as used herein is not limited to a literally U-shaped structure. Instead, the term "U-shaped" is intended to describe any structure that is physically similar to the roller-coaster-type restraining bar 106, i.e., closes over the shoulders of a wearer, and includes other shapes, such as a "V" or other shapes and shapes that are filled in partially or completely in the center of the roller-coaster-type restraining bar 106, which is shown as being generally open in the figures provided herein.

Said roller-coaster-type restraining member 106, as described herein, restrains a person into place by locking said restraining member 106 in place close to or touching the person desired to be restrained, such that the overall movement of the person is restricted. To facilitate the placement of the child into the body 104 of the restraining seat 100, the roller-coaster-type member 106 is rotatable, indicated by the arrows 124 in FIG. 1, toward and away from the secured seating area 107.

Now, advantageously, for the first time, a child seat provides a mechanism that allows the child to be almost instantly safely and comfortably restrained within a seat and without the straps or belts digging into the skin of the child, leading to possible injuries and discomfort. Once the child is placed in the seat, a simple and quick rotation places the restraint bar 106 into position without the need to align buckles or clips or thread the child's arms through the straps.

Figure 2:
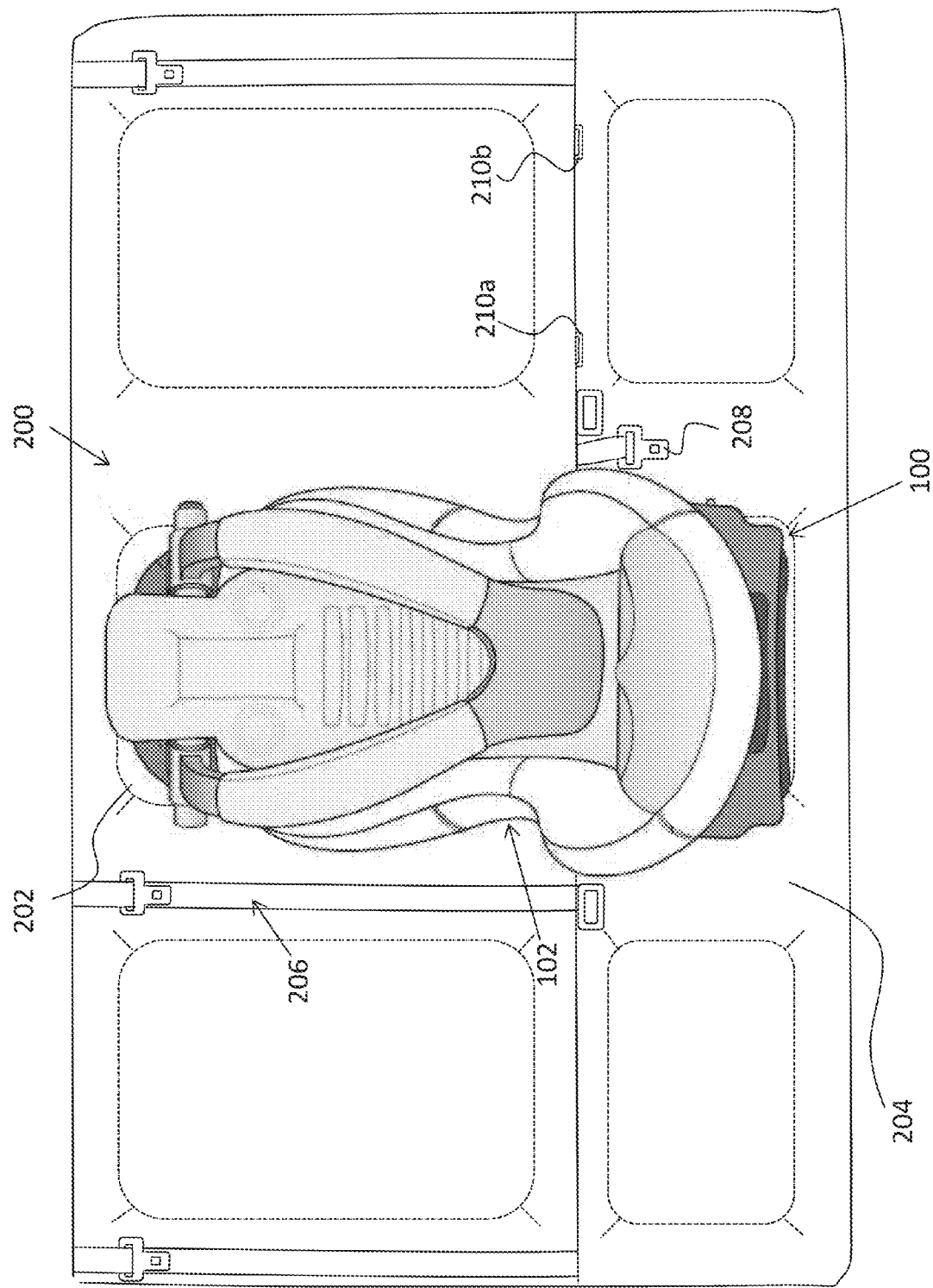
FIG. 2 is an elevational front view of the portable child restraining sub-seat selectively attached to a primary seat of a vehicle in accordance with an exemplary embodiment of the present invention.

Referring now to FIG. 2, the sub-seat 102 of the child restraining seat 100 can be seen selectively attached to and supported by a functional primary seat 200 sized to fit an average adult-sized human. FIG. 2 also illustrates a partial view of the back seat of an automobile that serves as an example of the primary seat 200. Generally, the sub-seat 102 is selectively attachable to the primary seat 200, with the primary seat 200 including a primary back support member 202 and a primary seat member 204. In many instances, the sub-seat 102 will be attached to a vehicle used in transportation that travels at high speeds and that potentially creates substantial forces, such that sub-seat 102 will need not only to be supported at the lower part of the sub-seat 102, around the seat member 112, but also will need to be supported at the upper portion of the sub-seat, around the back support member 108. That support is provided in situations when the primary seat 200 includes the primary back support member 202 and primary seat member 204. In other instances, such support is not required or desired, such that the primary seat 200 may not include the primary back support member 202.

In one embodiment, the primary seat 200 may be the back seat of an automobile, but should not be limited to such. In other embodiments, the primary seat 200 may be the seat of another vehicle, such as a train or airplane or other structure that could serve to support the body weight of a human being. The presently inventive restraint system can also be utilized in a highchair or stroller, retrofitting a provided seat or as original equipment from the manufacturer. As described herein, the primary seat 200 may also include all attachments, structures, or mechanisms used to restrain human beings. Further, when the sub-seat 102 is not attached to the primary seat 200, the sub-seat 102 may be placed directly upon the floor/ground or carried by the user. Now, advantageously, a child can have the additional comfort and security of the roller coaster-type restraining member 106, with the efficient and convenient portability generally associated with child restraining seats.

Figure 5:
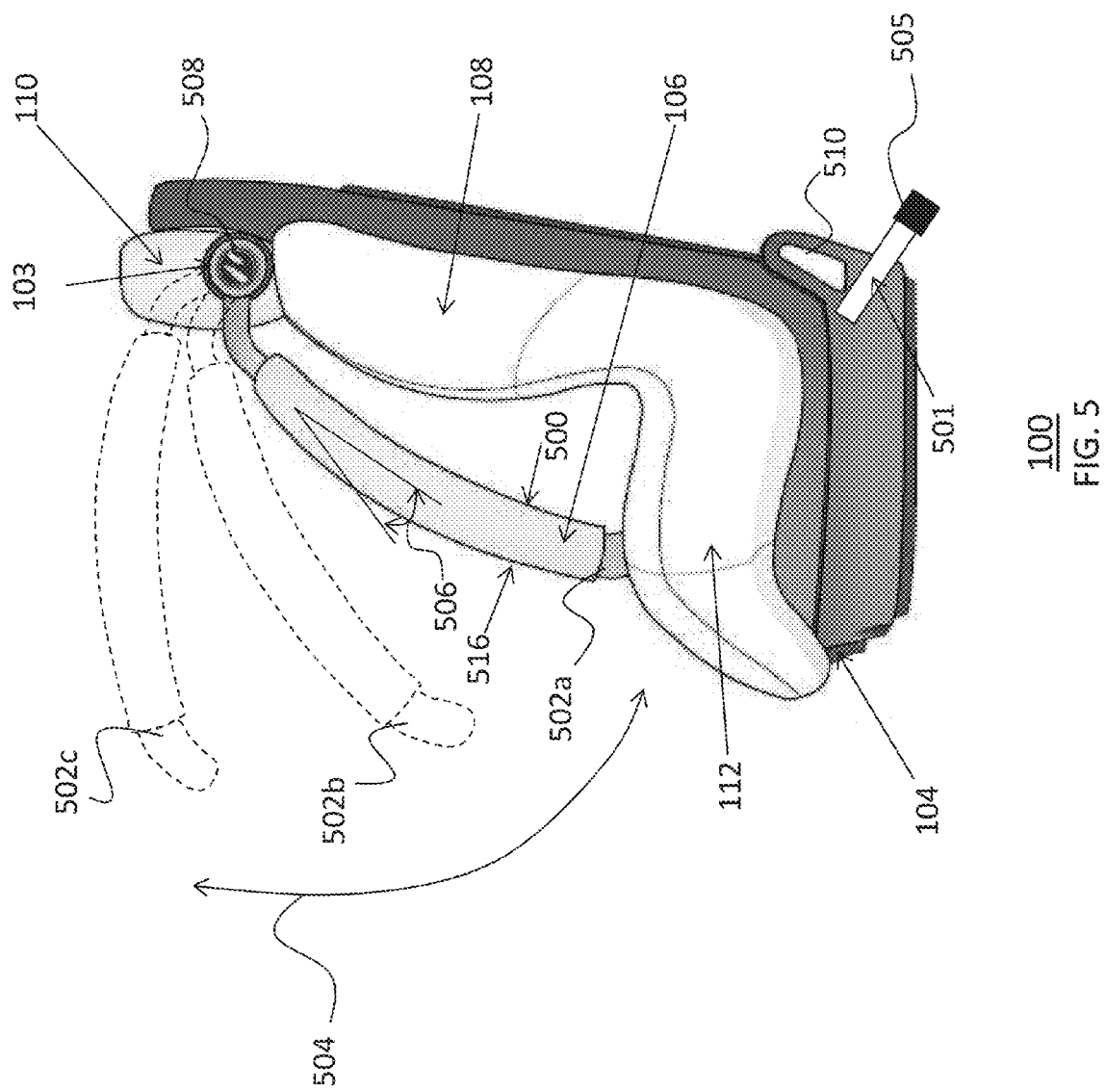
FIG. 5 is an elevational side view of the portable child restraining sub-seat of FIG. 1 featuring and showing various locations of the roller-coaster-type restraining member along a translation path and moving toward and away from a secured seating area and having at least one unlocked and locked positions along the translation path in accordance with an exemplary embodiment of the present invention.

The sub-seat 102 is selectively attachable to at least one anchoring point available on the primary seat 200. An anchoring point is any area where the sub-seat 102 can be attached such that it is mechanically secured to the seat. One or more anchoring points are required structures for at least the rear seats in all automobiles currently being manufactured. The safety seat 100, as shown in FIG. 5, is provided with two anchor members 501 (only the left is shown in FIG. 5) having a typical length separating each anchor member 501 of a standard lap belt 208. In one embodiment, the anchor member 501 includes a clasping head 505, used to couple with anchoring points 210a, 210b. The anchor members 501 are required for all current car seats, are well known in the art, and will not be further described herein, other than to say that the anchor members 501 are selectively attachable to the anchoring points 210a and 210b of a functional primary seat 200, which, without the safety seat 100 in place, is sized to fit an average adult-sized human. The term "selectively attachable," as used herein, is intended to indicate a structure that can be attached and unattached with, for example, a simple push of a button, or other simple mechanical manipulation. The term "average adult-sized human," as used herein, is intended to indicate a person of approximately 145 pounds or more and a height of approximately 5' or more.

Straps (not shown) can also be used, which attach the area around the head support member 110 of the sub-seat 102 to an upper anchoring point located on the top of or behind the primary seat 200. Upper anchoring points are required structures in all automobiles currently being manufactured.

Moreover, to assure the safety of the child and to comply with many laws or ordinances on child restraints, the sub-seat 102 is attached to the primary seat 200 by a lap belt 208 or shoulder belt 206. This may be accomplished by either sliding the shoulder belt 206 or lap belt 208 through one or more open portions 510 (shown in FIG. 5) formed by the body 104. In other embodiments, when such solid securing of the sub-seat 102 is not desired or required, for example, when attaching the sub-seat to a seat of a high chair, the sub-seat 102 may be placed on top of the primary seat 200 with no attachments or with fastening mechanisms with less tensile strength resistance such as snaps, buttons, Velcro, magnets, straps, or the like.

Figure 3:
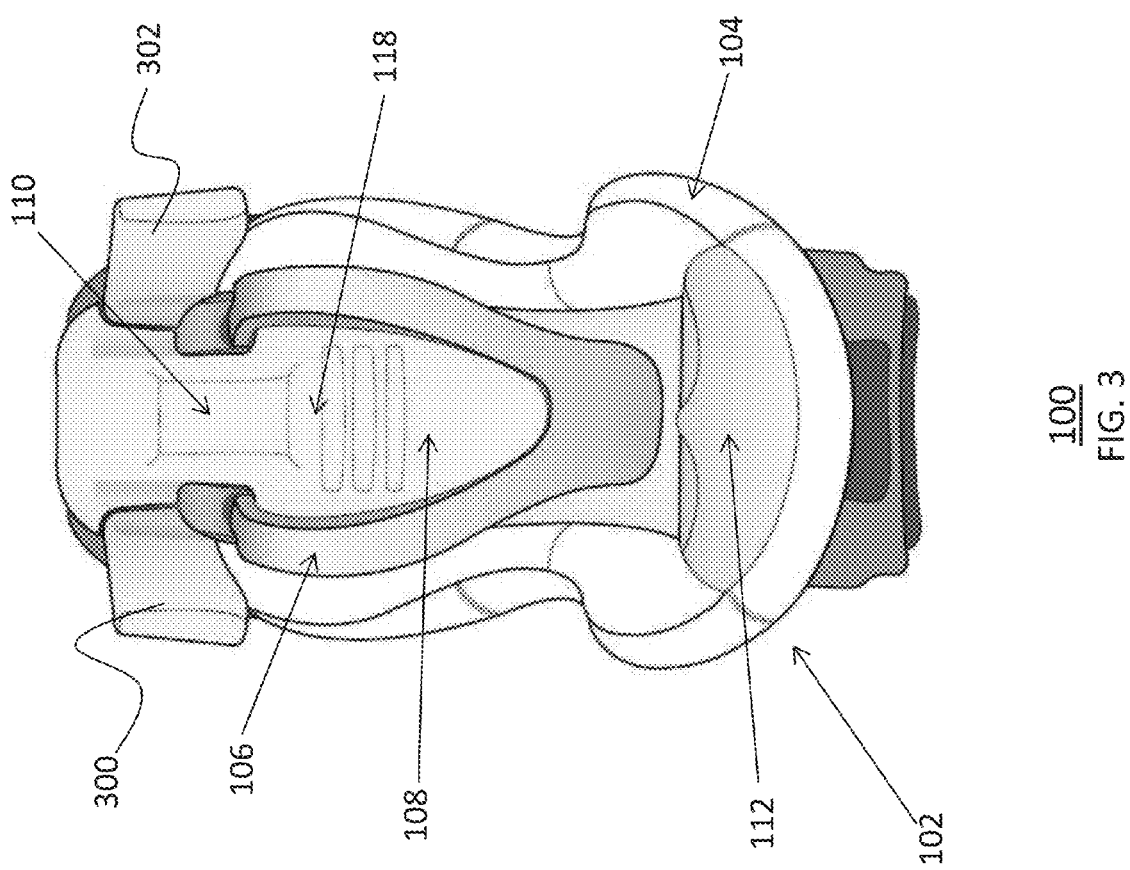
FIG. 3 is an elevational front view of the portable child restraining sub-seat of FIG. 1 featuring a head support member in accordance with the present invention.

Now referring to FIG. 3, in one embodiment of the present invention the head support member 110 has a right head support portion 300 and a left head support portion 302. The head support portions 300, 302 extend away from the upper end 118 of the back support member 108. The head support portions 300, 302 can be seen extending in the same direction in which the seat member 112 extends. The length of said head support portions 300, 302 is generally greater than approximately 3-4 inches, such that the child's head area is partially or completely covered and protected from the side. Said head support portions 300, 302 further protect the head-area of the child from potential glass or debris that could come from the side of the vehicle in which the child is traveling if said vehicle was involved in a collision. The head support portions 300, 302 also inhibit the child from viewing to the sides, which allows the child to sleep better, if desired. The head support portions 300, 302 also inhibit the child from reaching the upper sides of the sub-seat 102, or from reaching locks, doors, or window controls. In other embodiments, said side portions 300, 302 may be directly coupled to the roller coaster-type restraining member 106, as described below, or the back support member 108. In addition, other embodiments the sub-seat 102 may include more than two side portions 300, 302.

In yet another embodiment, the side portions 300, 302 are selectively pivotably-positionable with respect to body. The term "selectively pivotably-positionable" is defined herein as having the ability to turn or rotate to various positions, yet providing a resistive force against such movement. The said side portions 300, 302 may be pivotably-securable through resistive-hinge mechanisms, malleable materials, or similar mechanisms that would allow the side portions 300, 302 to pivot and then become locked into place, then requiring a force, as described above, to unlock said portions 300, 302 from the fixed positions. In other embodiments, the side portions 300, 302 are fixed at a certain positions and not pivotable.

Figure 4:
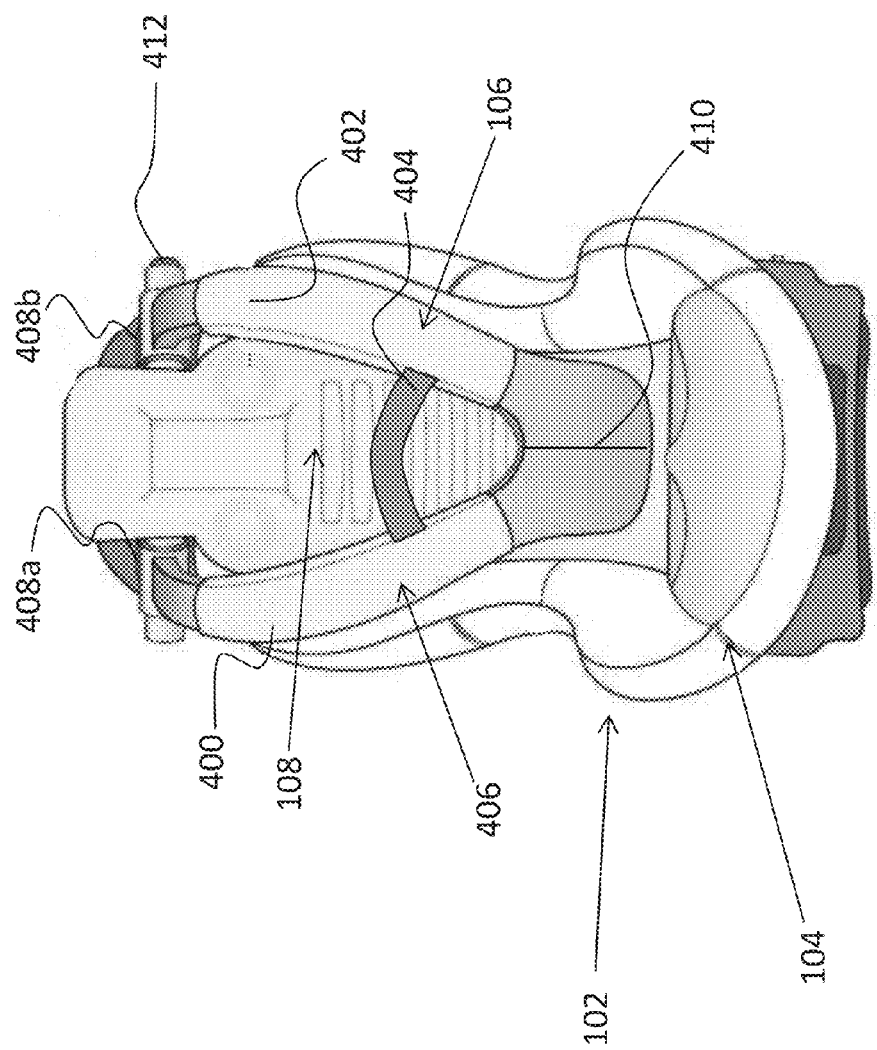
FIG. 4 is an elevational front view of the portable child restraining sub-seat of FIG. 1 featuring a roller-coaster-type restraining member emergency release lever in accordance with the present invention.

Referring now to FIG. 4, the roller coaster-type restraining member 106 can be seen having a first upper body restraining member 400 extending away from the back support member 108 in accordance with an embodiment of the present invention. In another embodiment, the roller coaster-type restraining member 106 has a second upper body restraining member 402 extending away from the back support member 108. The term "upper body" is defined as the area of child extending approximately from the stomach to the upper area of the shoulder. In yet another embodiment, the roller coaster restraining member 106 can be seen having a lateral support member 404 coupled to the upper body restraining members 400, 402. In one embodiment, the roller coaster-type restraining member 106 has both upper body restraining members 400, 402 and the lateral support member 404 such that child restrained will have at least three contact points with the roller coaster-type restraining member 106. In other embodiment, the restraining member 106 has a lateral support member 404 extending across the chest of the child being restrained for additional support.

Restraining the child as described assures that child will be safely and comfortably restrained. In connection with said embodiment, the body 104 of the sub-seat 102 or the restraining member 106 may also have portions that contour around the sides of the child to provide a restraining seat 100 that assimilates to a 5-point harness. The upper body restraining members 400, 402 and lateral support member 404 may be injection molded or formed into one piece or made from individual pieces and assembled. In other embodiments, the roller coaster-type restraining member 106 may have only one, or more than one upper body support members 400 supporting the child.

The roller coaster-type restraining member 106 is fixed in shape and made from a fixed substantially non-pliable material. "Fixed" is defined as having a shape that generally does not change, excluding minor elastic deformation, unless there is a substantial amount of force applied to a portion of the shape such that there is plastic deformation, as would happen to most materials subjected to the same or similar forces. In another embodiment, the restraining member 106 is a flexible resilient material formed in the general U-shape, as described above.

One embodiment of the present invention provides integral skin foam that has a tougher skin, yet a soft interior, allowing for impact absorption. Integral skin foam, also known as self-skin foam, is a type of foam with a high-density skin and a low-density core. They can be formed in an open-mold process or a closed-mold process. In the open-mold process, two reactive components are mixed and poured into an open mold. The mold is then closed and the mixture is allowed to expand and cure. Examples of items produced using this process include arm rests, baby seats, shoe soles, and mattresses. The closed-mold process, more commonly known as reaction injection molding (RIM), injects the mixed components into a closed mold under high pressures. Other embodiments may include flex molded foams, higher density viscoelastic foams, and composites or polymers having a resilient fixed-shape with properties that allow it to elastically deform upon pressure from the child. In further embodiments, the roller coaster-type restraining member has a rigid outer surface 406, but has an inner surface 500 (shown in FIG. 5) that is soft. The inner surface 500 (shown in FIG. 5 may also include portions that contact with the child that are inflatable to a desired thickness. In yet another embodiment, the restraining member may be made from a seat belt material that is stiffened to create the fixed general U-shape as described above. In this embodiment, the stiffened seatbelt material has a natural resting shape, i.e., one that is expressed when the material is placed on a surface with no external forces applied, that resembles the U-shape shown in the drawings or expanded by the above-provided definition of the term "U-shaped," as used herein.

Referring now to FIG. 5, the roller coaster-type restraining member 106 is rotatable at a pivot point 103 toward and away from the back support member 108 such that a child may be placed within the body 104 and fastened securely by a simple rotation of the restraining member 106. In accordance with one embodiment, the roller coaster-type restraining member 106 has at least two locked positions 502a, 502c along a translation path 504 defined by the roller coaster-type restraining member 106 when rotated toward and away from seating area 107. The translation path 504 is made up of a plurality of positions 502a, 502b, 502c. In other embodiments, the roller coaster-type restraining member 106 may fasten the child by pivoting from side-to-side or from bottom-to-top, instead from coming from the top of the head support member 110 down toward the seat member 112, such that the translation path 504 will vary accordingly. In one embodiment, the roller coaster-type restraining member 106 has one locked position 502a, exemplified in FIG. 5, such that the movement of child being restrained will be restricted. The roller coaster-type restraining member 106 will then have at least one unlocked position such that said restraining member 106 can be moved to a position along the translation path 504 so the child can be placed in the body 104. In the preferred embodiment, the roller coaster-type restraining member 106 will have various positions along the translation path 504, such that the child restraining seat 100 can advantageously accommodate and adjust to children of different sizes. Having the adjustability of the restraining member 106 along with the comfort and superior child security, gives the user versatility and peace of mind not achieved with the prior art.

As illustrated in FIG. 5, when the restraining member 106 is in the upper locked position 502c, the seating area 107 unobstructed such that the child may be placed inside the body. "Unobstructed" is defined herein as indicating that the restraining member 106 is open, out of the way, and does not significantly interfere with the placement of a child into the seating area 107. The user then manipulates the restraining member 106 into a lower locked position 502a, such that the seating area 107 is obstructed, specifically preventing removal of the child placed within. In one embodiment, the roller coaster-type restraining member 106 is provided with a ratcheted connection to the sub-seat 102 and moves along the translation path 504 with lockable positions available in approximately 5-10 degree intervals 506. In other embodiments, the roller coaster-type restraining member 106 may move in intervals 506 less than or greater than approximately 5-10 degrees.

In accordance with an additional embodiment of the present invention, the restraining member 106 is provided with an airbag, or similar inflatable safety mechanism, on the outer surface 516 of or within the restraining member 106. In one embodiment, the airbag, or similar mechanism, is activated automatically when a collision or comparable force is experienced by the seat 100. Upon detection of the predefined force limit, the airbag expands outwards and away from the child to create a cushioned barrier forward face of the seat. In the event the safety seat 100 is propelled forward, e.g., the automobile crumples, the front of the seat and child will be protected by the airbag. This additional feature also protects the child restrained in instances where the sub-seat becomes detached from the primary seat 200, such as in high velocity collisions or other instances where substantial forces are exerted onto the sub-seat 102.

In one embodiment, the roller coaster-type restraining member 106 is locked and unlocked into positions with a roller cost-type restraining member release switch 508. The roller coaster-type restraining member 106 is translated and locked into position through the use of one or more sets of gear teeth connected at one or more attachment points, located inside one or more sides of the head support member 110 or other areas where the restraining member 106 is coupled to. The roller coaster-type restraining member 106 is moved into an unlocked position and locked into position with a pin, that either locks the shaft or one or more gears themselves. Other embodiments may include various rack and pinion systems, worm drive gear systems, or other mechanisms used to translate and then lock said restraining member 106 into place at various positions. The translation of said restraining member 106 may done mechanically by hand, or electronically through the use of one or some motors, microcontrollers, actuators, and the like.

One additional significant advantage over the prior art that is provided by the present invention is that, for the first time, a parent can secure their child in a car seat using only one hand. That is, because the restraining member 106 can easily be translated into the various positions along the translation path 504 with only a single hand, the parent can use their other hand to hold objects, such as a diaper bag. Allowing the parent to conveniently translate the restraining member 106 with only one hand advantageously provides the user with the capability to fasten the child into place with a level of ease and effort that is not found in the prior art.

Figure 6:
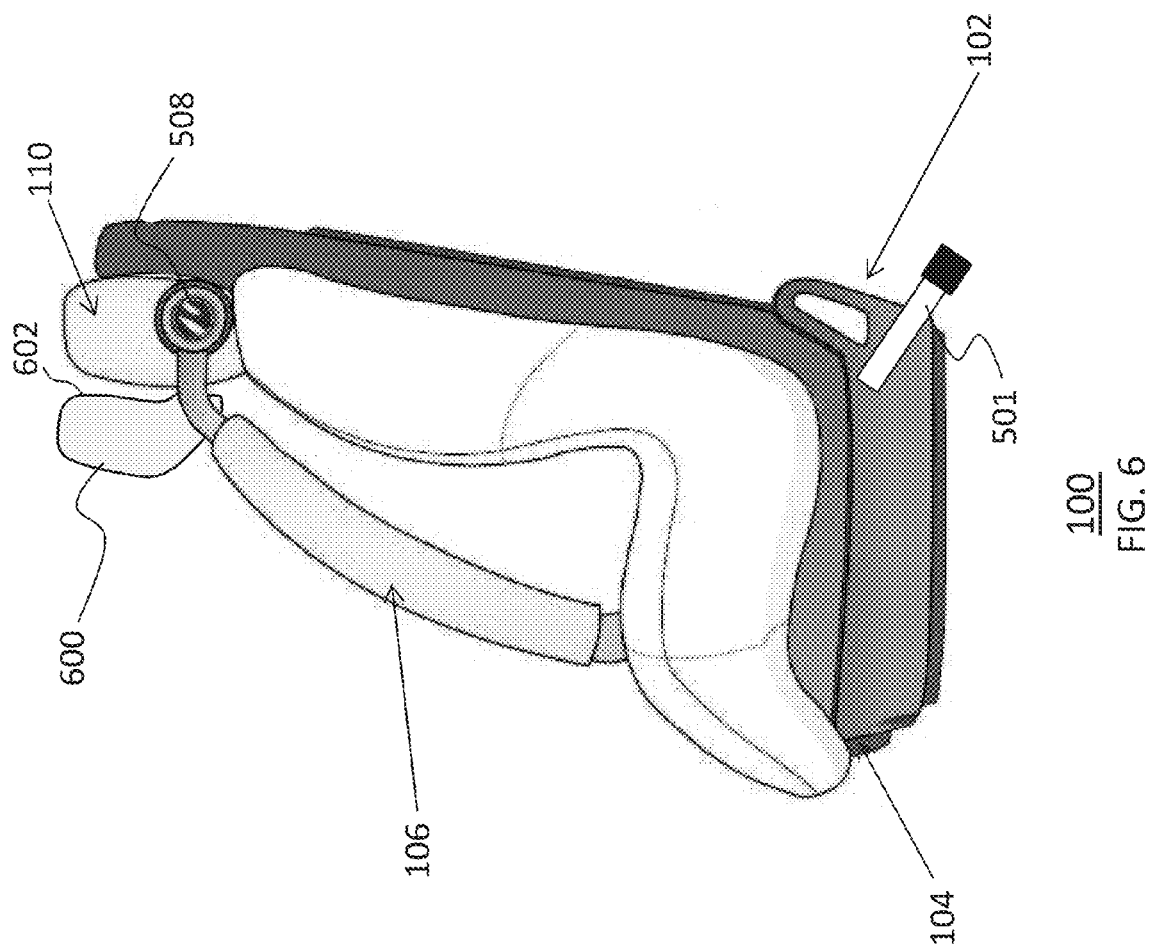
FIG. 6 is an elevational side view of the portable child restraining sub-seat of FIG. 1 featuring a side head support coupled to the roller-coaster-type restraining member in accordance with the present invention.

FIG. 6 illustrates an additional feature in accordance with the present invention. The roller coaster-type restraining member 106 can be seen having a side head support 600 coupled to the roller coaster-type restraining member 106, wherein the side head support 600 defines an inner portion 602 that is substantially adjacent and substantially non-co-planar to the head support member 110 when the roller coaster-type restraining member 106 is in at least one locked position. "Substantially adjacent," is defined herein as sharing a border with or immediately following a border of a surface or referenced area, not to exceed approximately 2-3 inches. The term "substantially non-co-planar" is defined herein as two or more points, planes, or surfaces not lying on or near the same plane.

With this feature, the child is further protected from potential debris or glass caused by collisions from the side of the vehicle he or she is traveling in, when the restraining member 106 is in a locked position 502a (shown in FIG. 5). It further limits side distractions from the child. In one embodiment, there is one side head support 600 coupled to the restraining member 106. In other embodiments, there is more than one head support 600 that protects the child from each side of the body 104. The side head support 600 may be coupled to the restraining member 106, by welding the two together or having them formed into one piece from outset of construction. In other embodiments, they may be coupled by bolting, clamping, or other similar attaching mechanism. The material used for the side head support 600 may be made with a material composition similar to the restraining member 106 or in other embodiments, a material similar to inside portions of the body 104, or combination of both the restraining member 106 or inside portions of the body 104.

In one embodiment of the present invention, the roller coaster-type restraining member 106 is selectively couplable to the body 104 of the sub-seat 102. Accidents and malfunctions happen in life. As such, if the restraining member 106 needs to be removed in emergency situations, a user or third party can easily detach/uncouple the restraining member 106 such that the child can be removed without the use of sharp cutting tools or larger equipment that could traumatize or injure the restrained child. Referring briefly back to FIG. 4, the sub-seat can be seen having a roller coaster-type restraining member emergency release switch 408a. Although FIG. 4 illustrates two release switches 408a-b, one for each side, other embodiments may include one emergency release switch or more than two emergency release switches. To uncouple the restraining member 106, user or third party would press one or more of the emergency release switches 408a-c that would uncouple the restraining member 106 from the body 104. In one embodiment, the emergency release switch 408a actually removes a portion of the restraining member 106 that is in contact with body 104. In other embodiments, the emergency release switch 408a may involve the use of a removable pin that releases the restraining member 106 from the body 104. In further embodiments, the restraining member 106 is removed through use of electrical components, for example, by using microcontrollers to control actuators. In other embodiments, the lateral support member 404 of the restraining member 106 is able to be separated along a line 410 so that the first upper body restraining member 400 and the second upper body restraining member 402 can move independently or can be translated laterally with respect to the pivot post 412 on which they pivot and removed to allow the child to also be removed from the seat 100.

Figure 7:
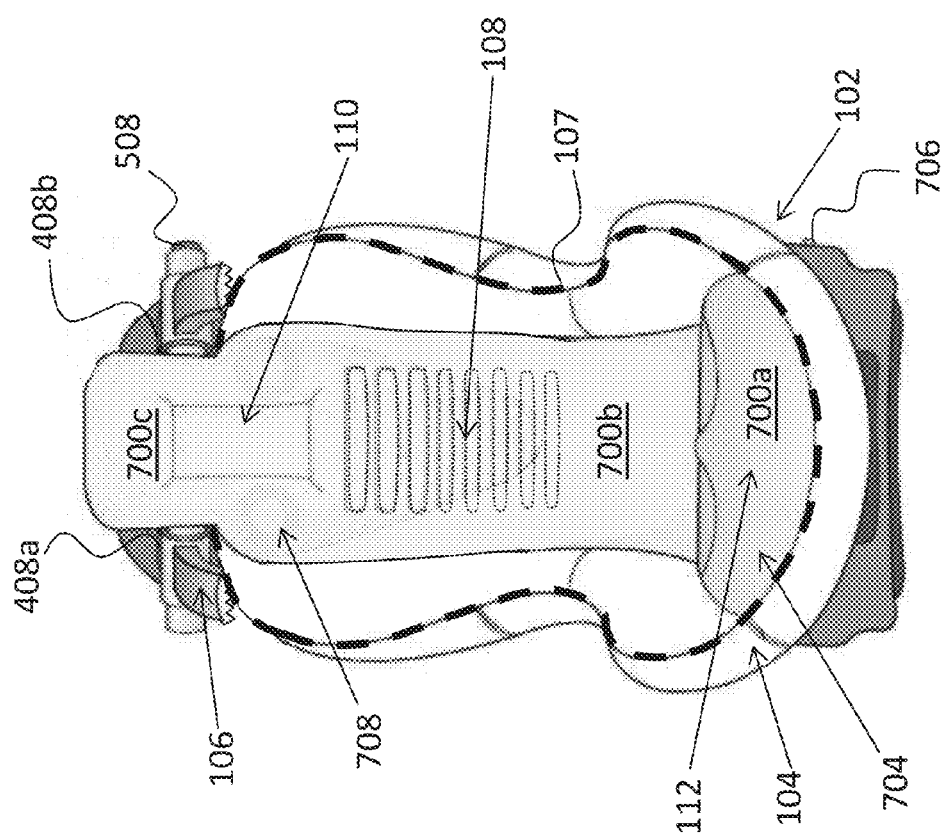
FIG. 7 is an elevational front view of the portable child restraining sub-seat of FIG. 1 and showing the body defining the secured seating area and the roller coaster-type restraining member release switch located outside the secured seating area in accordance with an embodiment of the present invention.

Now referring to FIG. 7, FIG. 7 illustrates the sub-seat 102 with the roller coaster type restraining member 106 partially removed around head support member 110. The back support member 108, head support member 110, and seat member 112 each generally include inner surface portions 700a-c. Those inner surface portions 700a-c are defined as the surface of each member 108, 110, 112 facing the area where the child generally could be restrained. The inner surface portions 700a-c also include surface areas within approximately 2-3 inches the outside perimeter of said inner surface portions. Said inner surface portions 700a-c are the portions of the body 104 that define the secured seating area 107, also considered such that the roller coaster-type restraining member release switch 508 is located outside the secured seating area 107.

In light of the recent studies showing how children have accessed and activated their belt/strap release buckles, the present invention advantageously places the restraining member release switch 508 outside the area where a child is restrained. It is important that children remain restrained while in the restraining seat 100 until the adult or supervising party releases them, especially while restrained in a vehicle traveling at high speeds. One embodiment of the present invention places the release switch 508 around the area outside the inside surface 700c of the head support member 110. As such, it is very difficult, if not impossible, for the child to press the release switch 508. In other embodiments, the release switch 508 may be at other areas outside the secured seating area 107.

In other embodiments, the emergency release switch 408a is also outside of the secured seating area 107 such that the child will not reach the emergency release switch 408a. In other embodiments the emergency release switch 408a, or emergency release switches 408a, 408b, is located in positions other than the secured seating area 107 and possibly in the secured seating area 107, with a more resistive/complex emergency release switch 408 such that would be difficult for the child to figure out or release the switch 408a.

In additional embodiments of the present inventions, the seat member 112 features a resilient foam-type material 704 on top of the inner surface 700a of the seat member 112. Generally, the inner surfaces 700a-c will have a soft, resilient material that would be comfortable to the child being retained, specifically while be restrained for long periods of time. Specifically, the resilient foam-type material 704 may include viscoelastic foam, such as memory foam, or polyurethane foam, with a resilience of about 40-70% (percent ball rebound). Having memory foam on the inner surface 700a of the seat member 112, or in other embodiments, over all inner surfaces 700a-c, provides superior comfort to the child being restrained.

In addition, embodiments of the present invention also include an audio connection 706 and controls where music or other audio may be played. The music is then played through one or more speakers 708 located around the head support member 110, such that only the child hears the audio and other persons around are not bothered. In other embodiments, the seat 100 may have Bluetooth or other wireless connection capability that facilitates the transfer of audio to the speakers 708. Moreover, the speakers 708 may also be located in other areas of the sub-seat 102, such as the back support member 108.

Figure 8:
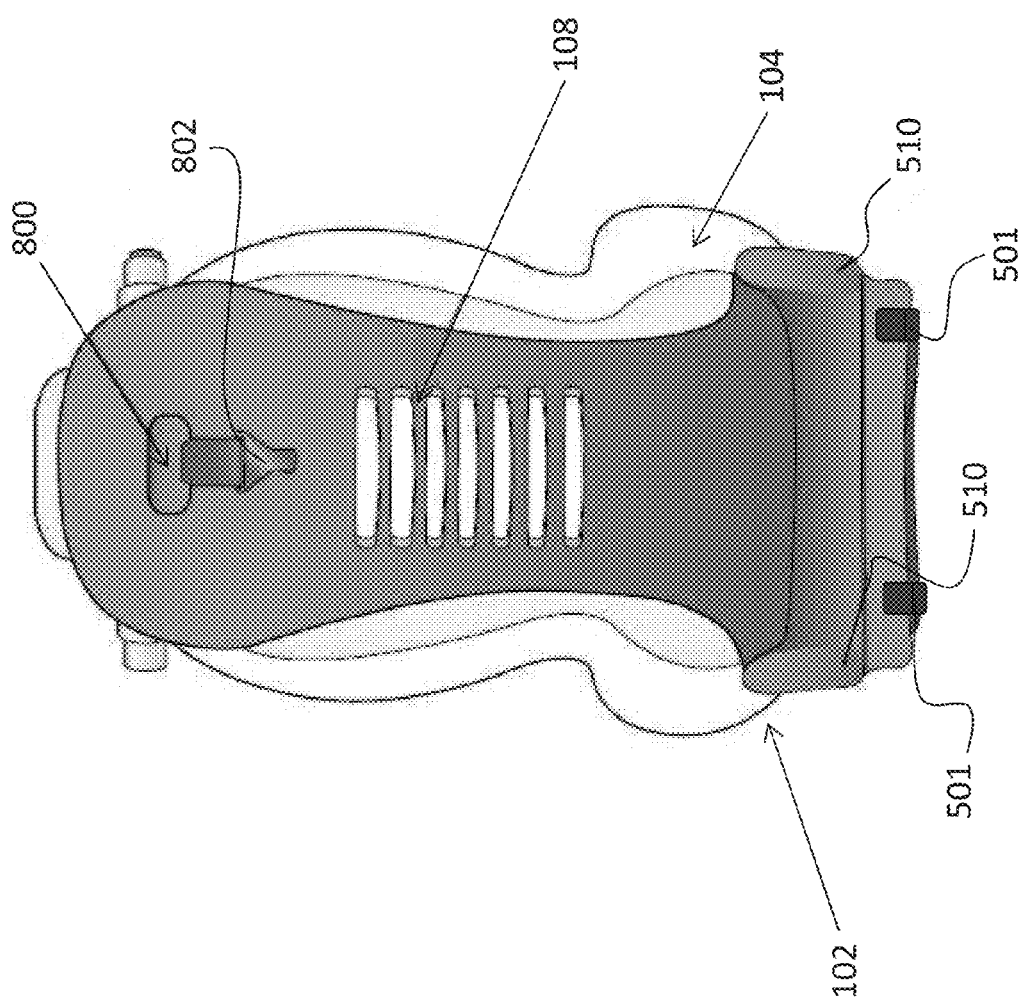
FIG. 8 is an elevational rear view of the portable child restraining sub-seat of FIG. 1 and showing various anchoring members in accordance with yet another embodiment of the present invention.

FIG. 8 illustrates the seat 100 from an elevational rear view in accordance with an embodiment of the present invention. As previously discussed, the sub-seat 102, or as illustrated, the body 104, includes one or more anchoring members 501 or open portions 510 for the body 104 to be attached to the primary seat 200. FIG. 8 further illustrates the body 104 having an upper anchoring point 800 in accordance with an additional embodiment of the present invention. The body 104 can be seen having a strap 802 with a hook that attaches onto another anchoring point available on the primary seat 200. The additional anchoring point provides additional support to the upper portion of the body 104 of the sub-seat 102.

Figure 9:
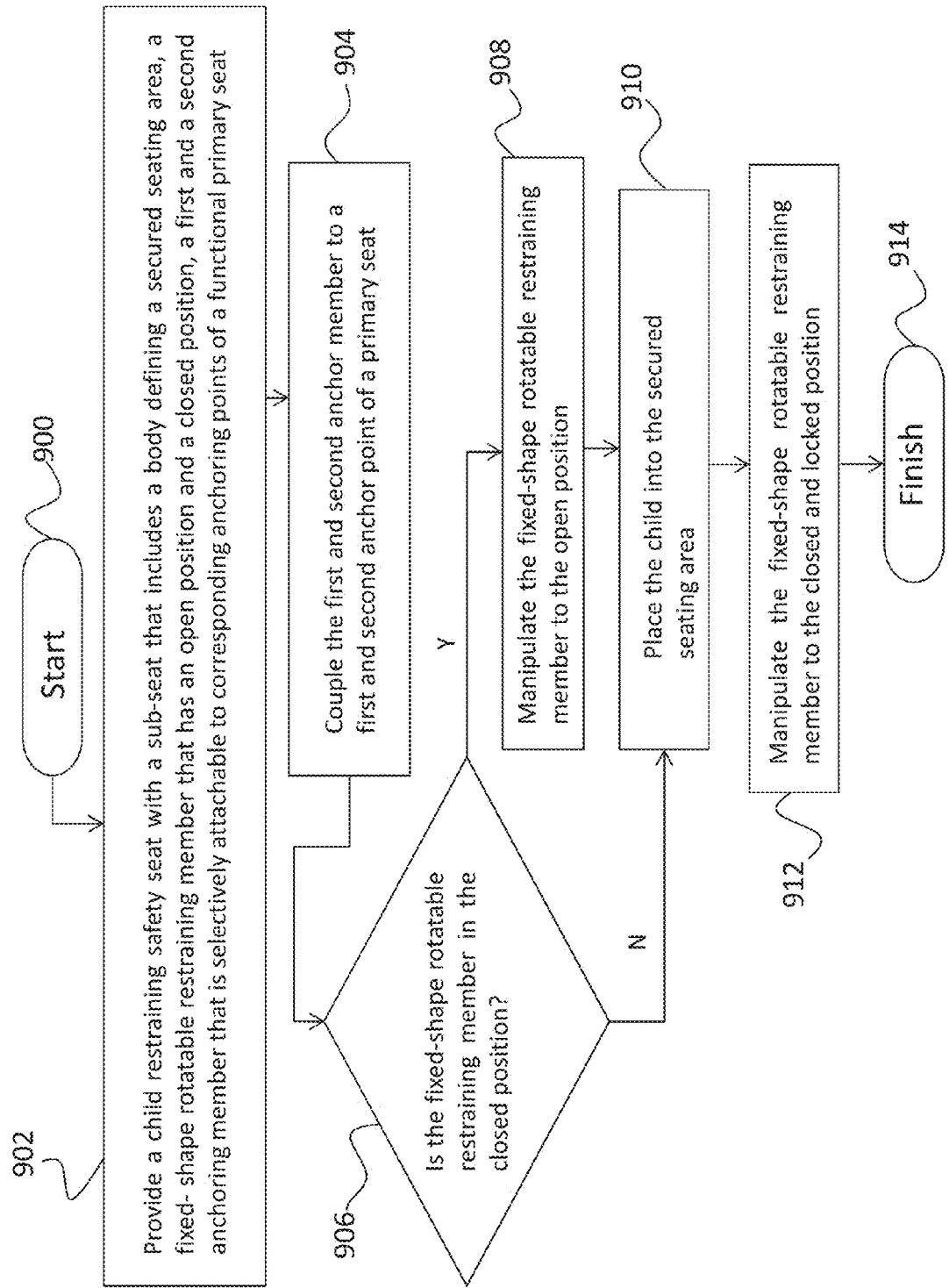
FIG. 9 is a process flow diagram of a method of securely transporting a child in accordance with the present invention.

FIG. 9 provides a process flow diagram of one exemplary method of utilizing the present invention. The process begins at step 900 and immediately moves to step 902 where the structure of the above-described invention is provided. In step 904 the first and second anchor of the sub-seat is coupled to a first and second anchor point of a primary seat. After the sub-seat has been coupled to the primary seat, step 906 involves determining whether the restraining member is in a closed position, such that the seating area is obstructed. If the answer to the query of step 906 is yes, i.e. the restraining member is in a closed position, step 908 involves manipulating the restraining member by rotating it into open position. If the query to step 906 is no, i.e. the restraining member is in an open position, the child is placed into the secured seating area in step 910. Step 912 involves manipulating the restraining member to the closed and locked position, such that child is restrained. Step 914 finishes the above described process such that the child may be comfortably restrained and safely transported.

Figure 11:
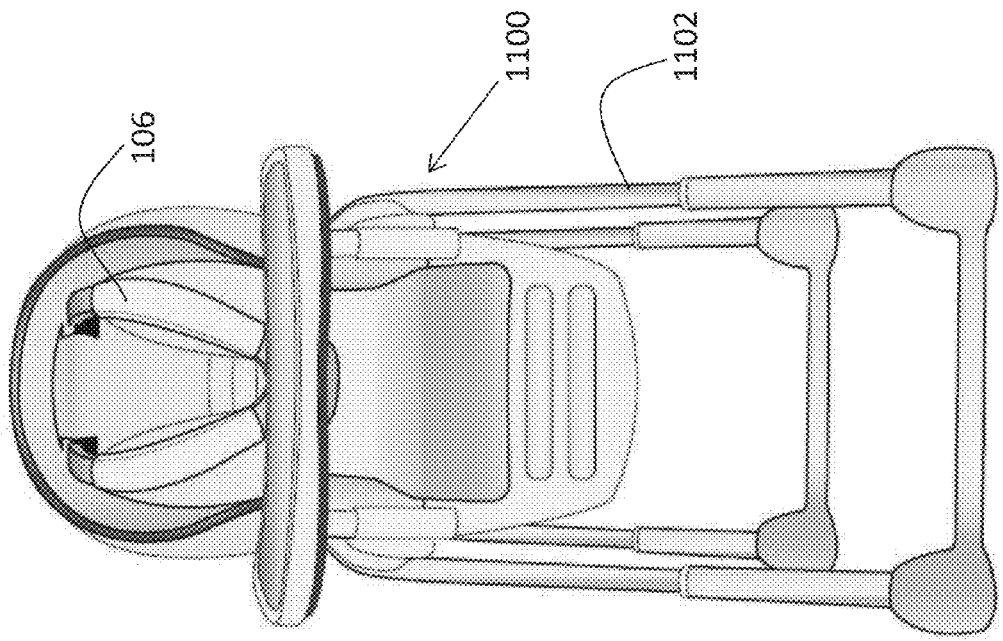
FIGS. 10 and 11 show front elevational views of a highchair with a roller-coaster-type restraining member in accordance with the present invention.
Figure 10:
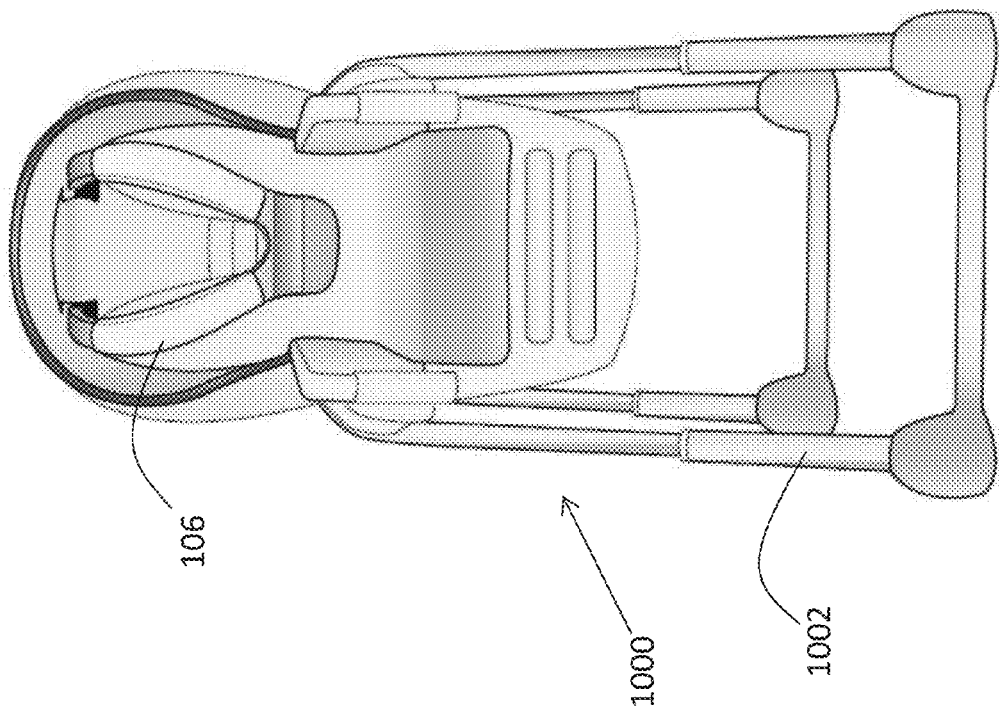

The roller-coaster-type restraining member described herein is suitable for other uses. For example, the roller-coaster-type restraining member 106 can be provided as a restraining member for highchairs 1000, 1100, such as those shown in FIGS. 10 and 11. The highchairs 1000, 1100 may incorporate many of the structural elements described above with reference to the car seat embodiment. The highchairs 1000, 1100 will generally, however, not be a sub-seat that attaches to an existing seat, but will, instead, be provided from the manufacturer with the elongated high chair legs 1002, 1102. In addition to the inventive roller-coaster-type restraining member 106, many known features of the existing highchairs can be incorporated, such as trays that remove, tilting seats, variable height adjustments, and many others.

A portable child restraining/safety seat and method of use has been disclosed that includes a sub-seat which quickly and easily attaches to a primary seat and features a roller-coaster-type restraining member. The inventive child restraining seat, provides numerous advantages over the prior art, which includes drastically improved securing and releasing of the safety mechanism that holds the child in place, improved security during a crash, prevention of unintended releasing of the safety mechanism by the child, and many others. The portable child restraining/safety seat further includes a head support member, a back support member, and a seat member, wherein the roller coaster-type restraining member is rotatable towards and away from secured seating area providing the added security to a child seat, while preserving the convenience, portability, and comfort desired for a child restraining/safety device. Other features of the invention have also been disclosed that add convenience for the children and owners of the restraining seat, but are not necessary and the present invention is not intended to be limited to the particular details disclosed herein.

What is claimed is:

1. A portable child-restraining safety seat assembly comprising:
   a sub-seat having:
      a body defining a secured seating area sized to accommodate a child or smaller-than-average adult human, the body having a back support member and a seat member, each with an inner surface portion at least partially defining the secured seating area; and
      a generally U-shaped roller-coaster-type restraining member mechanically coupled to the body, having a fixed pivot point, having a first upper body restraining member, having a second upper body restraining member, and being rotatable toward and away from the seating area, the U-shaped roller-coaster-type restraining member rotatable about the fixed pivot point to a lower locked position with:
         the first and second upper body restraining members of the generally U-shaped roller-coaster-type restraining member in an overlapping configuration with the inner surface portion of the back support member; and
         a distal end of the generally U-shaped roller-coaster-type restraining member uncoupled to the seat member; and
      a first anchor member and a second anchor member each having a first end mechanically coupled to the body and a second end selectively attachable to at least one anchoring point of a functional primary seat sized to fit an average adult-sized human.

2. The seat assembly according to claim 1, wherein the secured seating area comprises:
   the back support member with an upper end and a lower end opposite the upper end;
   a head support member coupled to the back support member at its upper end; and
   the seat member extending away from the lower end of the back support member.

3. The seat assembly according to claim 2, wherein the head support member comprises:
   a left head support portion and a right head support portion extending in a direction away from the back support member.

4. The seat assembly according to claim 2, wherein the head support member comprises:
   a left head support portion and a right head support portion coupled to the generally U-shaped roller-coaster-type restraining member.

5. The seat assembly according to claim 1, wherein:
   the first anchor member and the second anchor member include portions of seatbelt cloth material.

6. The seat assembly according to claim 1, wherein:
   the body is adapted to receive a portion of an existing seat belt of a vehicle.

7. The seat assembly according to claim 1, wherein:
   the roller-coaster-type restraining member is of a fixed substantially non-pliable material.

8. The seat assembly according to claim 1, wherein:
   the roller-coaster-type restraining member is of a flexible resilient material formed in the general U-shape.

9. The seat assembly according to claim 1, wherein:
   the generally U-shaped roller-coaster-type restraining member includes at least two locked positions along a translation path defined by the roller coaster-type restraining member when rotated toward and away from the seating area.

10. The seat assembly according to claim 9, wherein:
    the at least two locked positions include an upper locked position where the seating area is unobstructed by the generally U-shaped roller-coaster-type restraining member and a lower locked position where the seating area is obstructed by the generally U-shaped roller-coaster-type restraining member.

11. The seat assembly according to claim 1, wherein:
    the generally U-shaped roller-coaster-type restraining member is selectively couplable and decouplable to the sub-seat.

12. The seat assembly according to claim 1, further comprising:
    a roller coaster-type restraining member emergency release switch that selectively uncouples the generally U-shaped roller-coaster-type restraining member from the sub-seat.

13. The seat assembly according to claim 12, wherein:
    the emergency release switch is located outside the secured seating area.

14. A portable child-restraining safety seat assembly comprising:
    a sub-seat having:
       a body defining a secured seating area sized to securely hold a child or smaller-than-average adult human, the body having a back support member and a seat member with an inner surface portion at least partially defining the secured seating area;
       a fixed-shape rotatable restraining member mechanically coupled to the body, having a first upper body restraining member, having a second upper body restraining member, having an open position where the seating area is unobstructed, and having a closed position, the closed position with:
          the seating area is obstructed by the fixed-shape rotatable restraining member; and
          the first and second upper body restraining members of the fixed-shape rotatable restraining member in an overlapping configuration with the inner surface portion of the back support member; and
       a release switch disposed outside of the secured seating area, the release switch operably configured to place the fixed-shape rotatable restraining member in the open position; and
    a first anchor member and a second anchor member each having a first end mechanically coupled to the body and a second end selectively attachable to corresponding anchoring points of a functional primary seat sized to fit an average adult-sized human.

15. The seat assembly according to claim 14, wherein the secured seating is defined by:
    the back support member;
    a pair of opposing side walls coupled to the back support member; and
    the seat member.

16. The seat assembly according to claim 14, wherein:
the fixed-shape rotatable restraining member is of a substantially non-pliable material having a general U shape.

17. The seat assembly according to claim 14, wherein:
the fixed-shape rotatable restraining member is selectively couplable and decouplable to the sub-seat.

18. The seat assembly according to claim 14, further comprising:
a restraining member emergency release switch that selectively uncouples the fixed-shape rotatable restraining member from the sub-seat.

19. A method of securely transporting a child, the method comprising:
providing a portable child-restraining safety seat assembly that includes:
a sub-seat having:
a body defining a secured seating area sized to securely hold a child or smaller-than-average adult human, the body having a back support member and a seat member; and
a fixed-shape rotatable restraining member mechanically coupled to the body and having an open position where the seating area is unobstructed and a closed position where the seating area is obstructed by the restraining member, the fixed-shape rotatable restraining member having a first upper body restraining member and a second upper body restraining member, wherein the first and second upper body restraining members overlap a seating surface of the back support member in the closed position; and
a first anchor member and a second anchor member each having a first end mechanically coupled to the body and a second end selectively attachable to corresponding anchoring points of a functional primary seat sized to fit an average adult-sized human;
coupling the first anchor member to a first anchor point of a primary seat;
coupling the second anchor member to a second anchor point of the primary seat;
manipulating the fixed-shape rotatable restraining member to the open position;
placing a child within the secured seating area; and
manipulating the fixed-shape rotatable restraining member to the closed position to retain an upper body of the child with the first and second upper body restraining members and where a distal end of the generally U-shaped roller-coaster-type restraining member is uncoupled to the seat member.

20. The method according to claim 19, further comprising:
selectively locking the fixed-shape rotatable restraining member into the closed position.

\* \* \* \* \*